C. E. PATRIC.
Grain-Drill.
No. 6,274. Reissued Feb. 2, 1875.
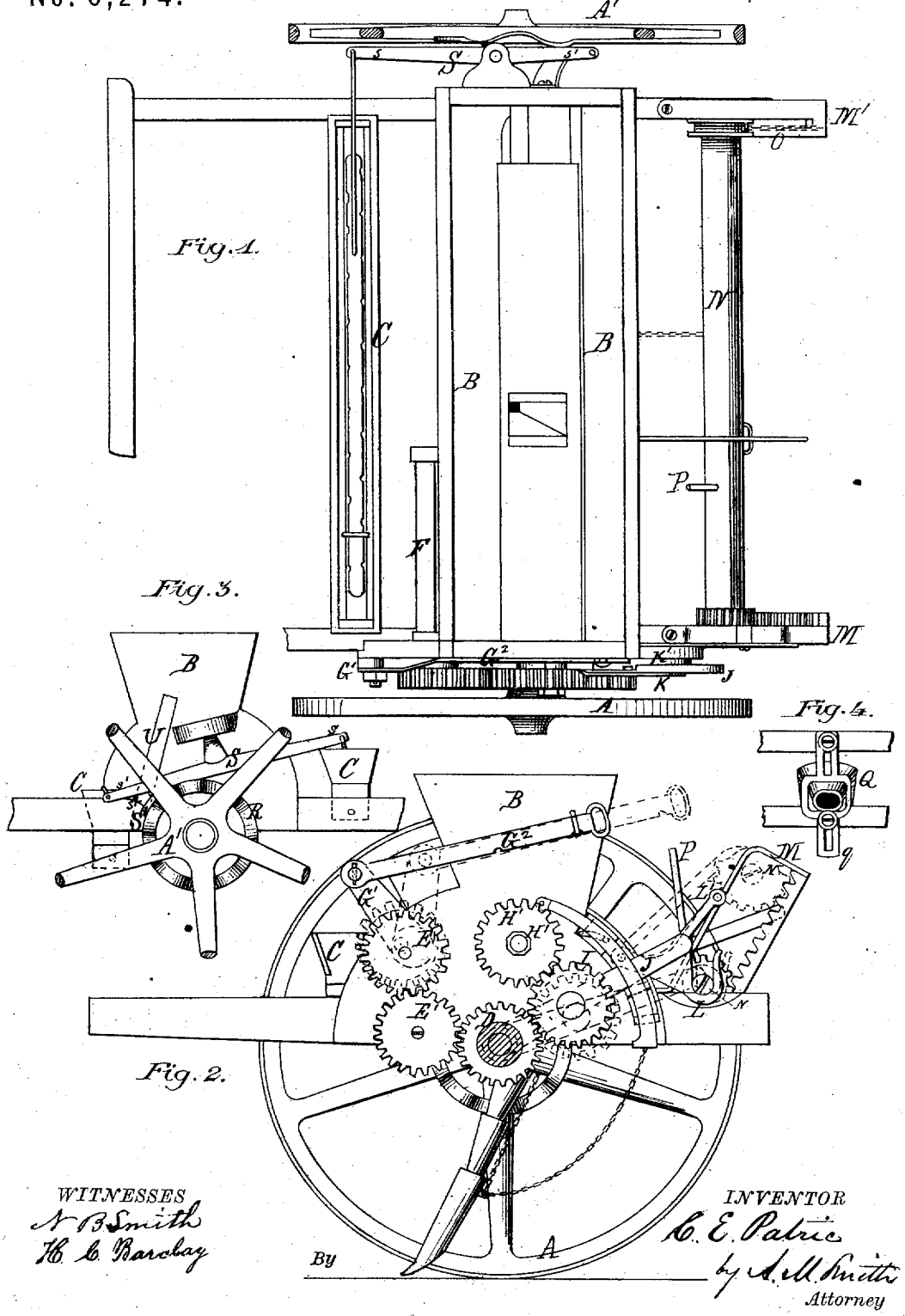
WITNESSES
N. B. Smith
H. C. Barclay
INVENTOR
C. E. Patric
by A. M. Smith
Attorney
By
THE GRAPHIC CO. PHOTO-LITH. 39 & 41 PARK PLACE, N.Y.

UNITED STATES PATENT OFFICE.

CHARLES E. PATRIC, OF SPRINGFIELD, OHIO.

IMPROVEMENT IN GRAIN-DRILLS.

Specification forming part of Letters Patent No. 85,472, dated December 29, 1868; reissue No. 6,274, dated February 2, 1875; application filed January 9, 1875.

*To all whom it may concern:*

Be it known that I, CHARLES E. PATRIC, formerly of Macedon, county of Wayne, State of New York, but now of Springfield, county of Clark, State of Ohio, have invented certain new and useful Improvements in Grain-Drills, of which the following is a full, clear, and exact description, reference being had to the accompanying drawing making part of this specification, in which—

Figure 1 is a plan or top view of the drill. Fig. 2 is an end view, showing in dotted lines the operation of the devices for throwing the distributer into and out of action. Fig. 3 is a side view, showing the devices for operating the grass-seed agitator; also the two positions of the grass-seed hopper, in front and in rear of the grain-box. Fig. 4 is a view of the adjustable tube or grain-spout, with means for adjusting the same.

The object of my improvement is to render more perfect the operation of throwing int and out of action the grain-seeding devices, and for communicating motion thereto; also, to so construct the machine that the grass-seeder can be used either in front of or behind the main hopper or grain-box, for sowing the grass-seed either in front or in rear of the drill-teeth, as the condition of the ground operated upon or of the atmosphere may suggest or require; also, to adapt the grain-spouts to deliver the grain from each alternate one in the rear of the others, or on the same transverse line, as may be desired; also, a novel means for hanging and elevating the back roller, and an improvement in the devices for throwing into and out of gear the shaft which operates the guano-distributer.

The nature of these improvements will be more fully understood by reference to the drawing, in which—

A A′ are the wheels, upon which are mounted the frame supporting the hoppers B and C, B containing grain, and C grass-seed. C is the grass-seed hopper, which is constructed in such manner as to permit its attachment either in front or rear of the grain-hopper, as occasion shall require. D is a pinion rigidly attached to the wheel A. E is a pinion attached to and driving the shaft F, which, in turn, drives the guano-distributer. (Not shown on the drawings.) E′ is a transmitting or intervening pinion. G is a round plate or block of metal, closely fitted into the wooden side piece supporting the hoppers, and rotated upon its own axis by means of the arm $G^1$ and notched bar $G^2$. In this plate G I form a bearing for one end of the shaft F. This bearing is placed eccentric to the plate G, so that when the said plate is rotated the pinion E is thrown in and out of gear. H is a pinion, driving the shaft which operates the grain-distributer. This pinion may be removed by taking off the nut H′, and one of a larger or smaller size substituted therefor, for the purpose of changing the speed of the distributers. I is a transmitting-pinion mounted upon the arm J. K is a strap or guard, serving to confine the arm J in the notches or recesses of the carrying-sector K′, which is operated by the slotted bent lever L, which is pivoted upon the standard M at L′. The line of direction in which the sector K′ moves is controlled by a slot in one end of the sector fitting over a pin, and a pin in the other end playing in a slot in the wooden frame-work of the drill. To this pinion is attached the bent lever M. M′ are two standards supporting the roller N. The lifting-roller is shown connected at one end with the top of the standard M by means of a chain or cord, O, which, as the roller is rotated on its own axis by means of the lifting-lever, winds upon the ends of the roller, or upon a grooved pulley connected therewith, and so lifts that end of the roller to any desired height.

A rack and pinion or segment of pinion similar to that described in Letters Patent granted to me December 17, 1867, are employed at the other end of the roller, which is adjacent to and connected with the shipping-lever, for giving a positive movement in both directions; but, if desired, chains or cords may be applied at both ends of the roller.

Q is a grain-spout, attached to the distributer by means of a link, the connection being such that said spout may be adjusted to deliver the seed to the drill-tubes or hoes when the latter are arranged either in a straight or zigzag line. *q* is a slide for guiding and steadying the adjustable spouts. This slide is held in position on the frame-work of the drill by means of bolts or screws passing through the slots in the slide, said fastenings permitting the free longitudinal movement of the slide when the spouts are vibrated, to adapt them to discharge the seed in the same transverse line, or each alternate one in rear of the others. R, Fig. 3, is an undulating or corrugated cam-wheel, fastened to and moving with the wheel A′, supporting the frame of the drill. S is a lever, pivoted about midway of its length in bearings secured either to the frame or main hopper. One end, *s*, of the lever extends in front, and the other, *s′*, in rear, of the main hopper or grain-box, both of which ends are provided with perforations, in one or the other of which the hook or pitman that drives the grass-seed agitator is secured, according as the grass-seed hopper is placed in front or rear of the grain-box. The arm S is provided with a short arm or stud, $S^2$, which extends down and at right angles to the two arms *s s′*, and upon which arm is mounted a friction-roller, $S^1$, which engages with a cam wheel or track, R, mounted upon one of the driving-wheels, and by means of which cam-wheel R motion is communicated through the levers S to the pitman which drives the grass-seed agitator, as above explained. The friction-wheel $S^1$ is kept in contact with the cam-wheel R by means of a spring, U.

The operation of my drill is as follows: After putting a proper quantity of seed-grain and guano into their respective hoppers, I thrust the bar $G^2$ forward until the pinion E is in gear with the pinion E′. The notch in the bar $G^2$, dropped over the lower leg of the staple or pin, serves to keep the bar in position.

The grain-distributers I put in operation as follows: Having determined the amount to be sown per acre, I place upon the shaft carrying the grain-distributers a pinion of such size as will give them the rapidity of motion necessary; then lower the lifting-roller down to the bottom of the standard, thereby throwing the bent lever and sector K′ forward; this also lets the teeth down on the ground. Next raise the arm J until the pinion I engages with the pinion H; then slip the arm into one of the notches on the sector or rack K′.

It will be seen that the arm J has for its center of motion the center of the pinion D; consequently, in whatever position the said arm J may be placed, the pinion I is always in gear with the pinion D, being, in fact, merely rotated about it in the arc of a circle. This enables me to change the size of the pinion H without making a corresponding change in the size of the pinion D.

When, from any cause, I wish to lift the teeth out of the ground and throw the distributers out of action, I depress the lever P. This elevates the roller N, the wrist of which, N′, operating through and by means of the bent lever L, sector K′, and arm J, withdraws the pinion I, thereby stopping the delivery of the grain until I again lower the teeth.

It will be apparent that the ordinary devices for throwing the seed-distributer into and out of action simultaneously with and by means of the mechanism employed for lifting the grain-tubes cannot be used advantageously with machines in which the roller to which are attached the chains for lifting the tubes is itself raised and lowered by means of chains or a rack and pinion.

It is desirable that the seeder should be thrown out of action with the first movement of the roller, before the tubes are taken from the ground, and then so held until they are down ready to enter the ground again. This cannot be done by making the connection directly from the roller to a clutch, or an equivalent device, by an arm or rod, as is ordinarily done, because the distance traveled by the roller is greater than would be convenient for the clutch or intervening pinion to move; and if a slotted lever or arm is used, then the seeder will remain in action until the shaft has nearly reached the limit of its upward throw. But by the use of a shipping-lever provided with a cam-slot, open at one end, so that the projection on the roller, whether it be in the form of an extension of the journal upon which the shaft rotates, or a pin or crank projecting from the shaft itself, shall, upon motion being communicated to it by the operator, immediately disconnect or throw the seeder out of gear, and then pass out of the slot to any desired distance without further affecting the gearing; then, when the shaft is being lowered, it will, just before reaching the lower end of its throw, enter the cam-slot and bring the seeder again into action.

This device can be used equally well in case the bearings of the pinion should be made stationary, and the rack be made to travel—that is, a rack at each end of the shaft, with a cross-bar connecting the two, with the tube-chains attached to said cross-bar. In this case all that is necessary is to have one end of the bar, or a pin or wrist attached thereto, engage with and operate the shipping-lever by means of the cam-slot. The only thing essential about the movement of the wrist or its equivalent is, that it shall have a positive reciprocating motion, and whether the line of its travel be straight or curved is immaterial, as a slight variation in the form of a slot is all the change necessary to make it work perfectly with either motion. It is not absolutely necessary that the slot shall be open at one end. It can, if desired, be made long enough to allow the pin to travel in it any required distance, provided that portion of it (the slot) above the cam conforms to the track followed by the pin, thus allowing the pin to move freely without affecting the shipping-lever, except at the beginning of its upward stroke, and at the close of its downward stroke.

Having now described my invention, what I claim as new, and desire to secure by Letters Patent, is—

1. The combination of the lever which supports the intermediate gear-wheel, through which motion is communicated to the distributer-wheels, with the lifting-roller, which raises the drill-teeth, substantially as described, whereby the distributer-wheels are thrown out of action in advance of the raising of the drill-teeth out of the ground.

2. The combination, in a seeding-machine, of the drill-teeth and the devices controlling the delivery of the seed with a traveling lifting-roller, substantially as described.

3. The shipping arm or lever which supports the intermediate gear-wheel, made adjustable for permitting a change of gears, in combination with the lifting-roller, substantially as described, whereby, under any adjustment of speed of the distributers, said distributers will be thrown out of action when the drill-teeth are raised, and into action whenever the said teeth are lowered into operative position.

4. The traveling roller, in combination with a chain or cord, O, arranged and operating substantially as described.

5. The combination, with a grain-drill or seeding-machine, of a removable grass-seed hopper, adapted to be applied either in front or in rear of the main hopper or grain-box, for discharging the grass-seed in front or in rear thereof, as described.

6. A reversible grass-seed hopper, or one adapted to be applied either in front or in rear of the main hopper or grain-box, in combination with mechanism for operating the grass-seed agitator under either arrangement, substantially as described.

7. The combination, with a grain-drill or seeding-machine, of adjustable grain-spouts, constructed substantially as described, and adapted to deliver the grain to the drill-teeth, arranged either in the same transverse line, or each alternate one in rear of the others, as set forth.

8. The eccentric rotating bearings G, in combination with the arm $G^1$, shaft F, and shaft $G^2$, for throwing the pinion E into and out of gear.

CHARLES E. PATRIC.

Witnesses:

ALEX. MAHON,

J. S. BOGLE.